United States Patent [19]

Acker et al.

[11] 4,354,393
[45] Oct. 19, 1982

[54] PHASE LOCKED GYROSCOPE WHEEL SUPPLY FOR SYNCHRONOUS HYSTERESIS MOTOR

[75] Inventors: Robert H. Acker, Packanack Lake; Frank L. Rosen, Parsippany; Donald J. Weber, North Caldwell, all of N.J.

[73] Assignee: The Singer Company, Little Falls, N.J.

[21] Appl. No.: 164,551

[22] Filed: Jun. 30, 1980

[51] Int. Cl.³ .............................................. G01C 19/10
[52] U.S. Cl. ........................................ 74/5.37; 74/5.7
[58] Field of Search .................. 74/5.37, 5.7; 318/314, 318/318, 721

[56] References Cited

U.S. PATENT DOCUMENTS 3,694,716  9/1972  Eland .............................. 318/314 X
4,257,280  3/1981  Coles et al. ....................... 74/5.7 X
4,258,579  3/1981  Olbrechts ......................... 74/5.7 X
4,274,291  6/1981  Schroeder ........................ 74/5.37

Primary Examiner—Rodney H. Bonck
Attorney, Agent, or Firm—John C. Altmiller; Thomas W. Kennedy

[57] ABSTRACT

Electrical and mechanical synchronization of two or more synchronously driven gyroscopes, mounted on the same platform, to minimize cross-talk induced drift, is achieved by bringing one gyroscope to a speed which is slightly higher than the other by driving it at a slightly higher frequency. At speed, coincidence of mechanical position is established by means of signals from pick-offs on each gyro and the drive for the faster gyroscope is shifted to the lower frequency. Electrical synchronism is established by restarting the lower frequency generator to instantaneously establish a predetermined relationship between a pick-off signal and the frequency generator. Phase-lock start-up of a single gyroscope by instantaneous shift of the phase of the driving voltage, relative to the gyroscope wheel position, is also provided.

13 Claims, 5 Drawing Figures

PHASE LOCKED GYROSCOPE WHEEL SUPPLY FOR SYNCHRONOUS HYSTERESIS MOTOR

BACKGROUND OF THE INVENTION

This invention relates to a method and apparatus for synchronizing the speeds of rotation of gyroscope flywheels. More particularly, the invention relates to improved methods and circuits for use in phase locking one or more gyroscope wheels at start-up.

An individual gyroscope instrument usually consists of a flywheel (momentum ring) and a motor for driving and maintaining the angular velocity of the wheel at a desired, precise level. Such an instrument often exhibits unwanted drift phenomena as a result of interaction between the flywheel and its motor. Thus, mechanical vibration due to imperfections in the ball bearings, raceways, and retainers results in synchronous vibration which acts upon various finite sensitivites of the flywheel itself and causes unwanted drift behavior in the instrument.

These mechanical effects can be minimized in a gyroscope by appropriate calibration of the instrument, accompanied by appropriate compensation. However, the economics of production often limit the degree by which the sensitivities can be reduced. Therefore, other techniques, such as phase locking, are employed, which are aimed at providing operational stability of the gyroscope by creating a repeatable and stable set of vibration profiles. In this way the inherent residual sensitivity of the gyroscope to synchronous vibration is maintained constant.

Phase locking provides for synchronization of the gyroscope at each start-up so that a sustained, repeatable, operating environment is provided. In general, this technique consists of determining the position, relative to a fixed point, of an arbitrary reference point on the gyroscope flywheel, and of aligning this point to an external reference signal wave form. This is done by means of a flywheel reference signal which is indicative of the angular position of the wheel about the spin axis of the gyroscope.

When a synchronous hysteresis motor is used to drive the gyro, electromagnetic coupling due to "side-pull" causes transverse and axial vibrations, which result from inherent imperfections in the rotor and motor-winding assembly. These vibrations are, by design, inherently synchronous and produce a drift of the gyroscope angle which can be shown to be directly related to the mechanical angle at which the motor attained synchronous speed. Since, for a normal synchronous hysteresis motor, this angle is arbitrary, it is desirable to provide an angle of synchronism which is repeatable each time the instrument is turned on so that repeatable drift performance is assured.

Techniques which are currently in use for reducing motor side pull also employ phase locking. Here, "interruption approaches" are used, in which the speed of rotation and the synchronization angle of a gyroscope are modulated until a desired angle between the motor voltage and a reference signal emanating from the flywheel is achieved. These techniques are complex to implement and often unreliable, since they depend upon motor dynamics, that is, acceleration or deceleration of the flywheel, to achieve the results, and are subject to variation from instrument to instrument.

In constructing platforms for use in inertial navigation packages, it is usual to employ a number of gyroscopes on a single platform. When so used, the gyroscopes may either be strapped down, that is, used without gimbal mounting, or they may be mounted in gimbals carried on the platform. The mounting of a number of gyroscopes on the same platform couples the gyroscopes together mechanically and mechanical cross-talk occurs between them due to the interaction of the synchronous vectors arising in each gyroscope. Further undesirable drift behavior is thus induced.

SUMMARY OF THE INVENTION

The present invention provides new methods and circuity for phase-locking a gyroscope at startup which are also useful for the synchronizing of two or more gyroscopes. When phase locking one gyroscope, the instrument is first brought up to speed, and the instrument performance is then optimized by instantly rotating the stator field of the motor to standardize the phase angle between the flywheel and the motor voltage. In this way, acceleration or deceleration of the flywheel to produce electrical synchronism is made unnecessary.

Mechanical synchronization of, for example, two gyroscopes is achieved, during the initialization period, by bringing one gyroscope to a slightly higher speed than the other. Because the gyroscopes are turning at slightly different speeds, the positions of flywheel indicator signals, generated by conventional gyroscope pickoffs, slip relative to one another, and, at times, coincide. At a time of coincidence, the frequency of the drive voltage for both gyroscopes is made identical to the speed of the slower gyroscope and mechanical synchronism is brought about by allowing the faster wheel to drift down in speed to match the slower one. Then, by instantaneously altering the position of the rotating drive fields, while the inherent momentum of the gyroscope flywheels maintains the speeds of the gyroscope essentially constant, the electric drive is synchronized to the gyroscope wheel positions. Alignment of the vibration vectors is thus complete.

In one embodiment of the invention, applicable to two or more gyroscopes, the alternating current voltages which produce the rotating electric fields of the synchronous motors are derived from a high frequency clock oscillator whose output is divided down to the wheel frequencies by means of digital dividers. The positions of the electric fields are thus established in standard circuit chips as a series of digital levels. Mechanical synchronization is brought about by switching both drives to one drive frequency. Since the flywheel position is inherently established by the orientation of the wheel itself, a change of relative position of the electric fields requires only an inertia-free change of signals in the digital logic. Orientation changes of, for example, up to 180°, can easily be accomplished within the period of one clock pulse. A repeatable, defined phase relationship is then implemented by re-setting (clearing) the countdown circuit upon recurrence of the flywheel reference signal and restarting drive signal generator immediately.

DETAILED DESCRIPTION OF THE INVENTION

Figure 1:
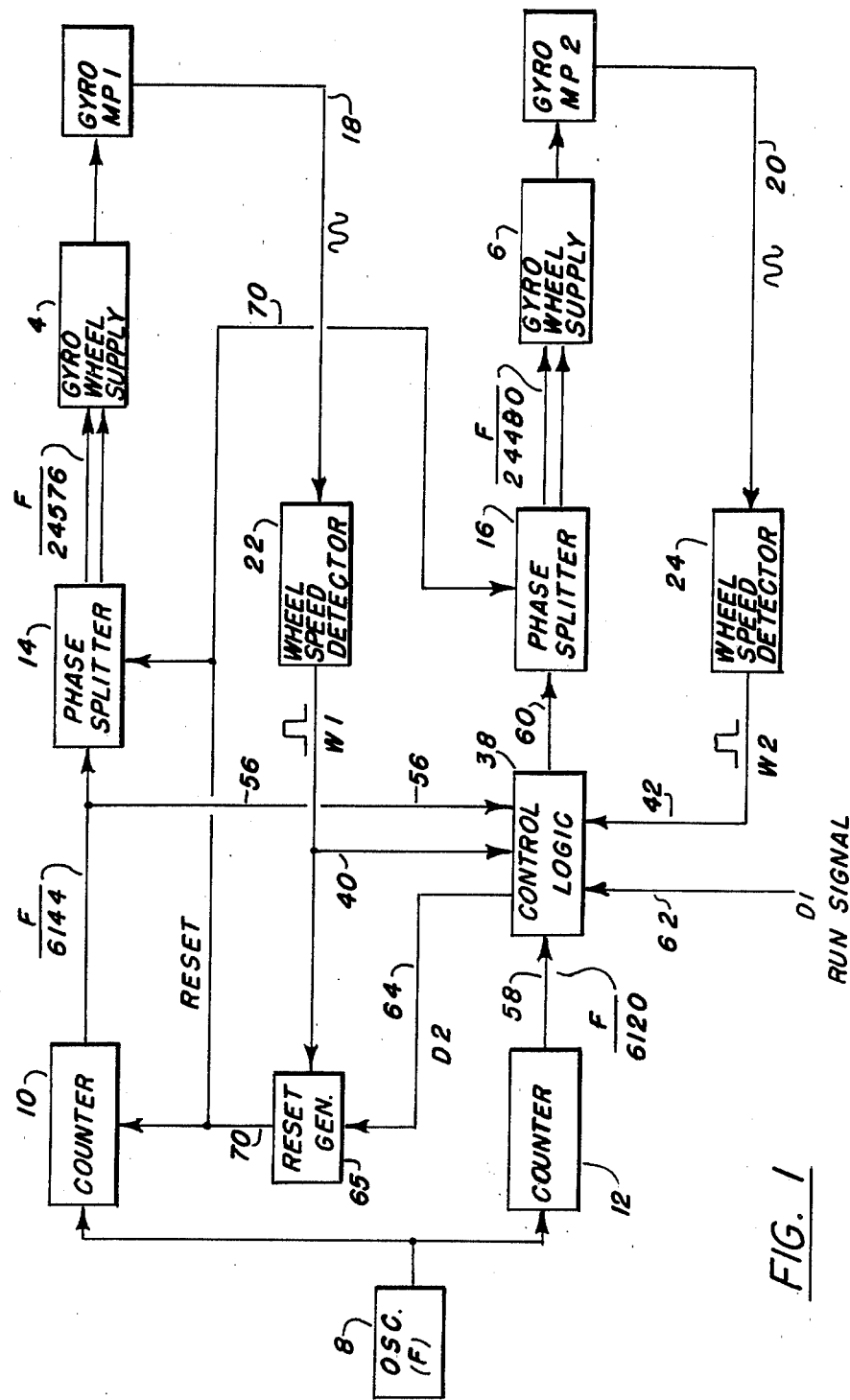
FIG. 1 is a block diagram of a circuit for synchronizing two synchronous gyroscope motors according to the teachings of the invention.

A circuit illustrating principles of the invention useful for synchronizing the speed and mechanical positions of the rotors of plural gyroscopes is illustrated in FIGS. 1 to 4. In these figures, the invention is applied to synchronizing two gyroscopes. The block diagram of FIG. 1 shows two motor-driven gyroscopes MP1 and MP2, which are driven by rotating voltages from gyroscope wheel supplies 4 and 6, respectively. Gyroscopes MP1 and MP2 are turned, for example, at speeds of 203.45 revolutions per second and 204.25 revolutions per second, respectively, by voltages derived by division from the output of clock pulse generator 8. In this illustrative embodiment of the invention, generator 8 operates at a frequency of 5 MHz. The pulsed output of generator 8 is supplied to counters 10 and 12 where it is separately divided by slightly different ratios; the outputs of the counters is supplied to phase splitters 14 and 16, respectively. The 4-phase outputs of phase splitters 14 and 16 are delivered to gyroscope wheel supplies 4 and 6, respectively, at frequencies which represent division of the basic 5 MHz oscillator frequency by 24,576 and 24,480, respectively. The input frequencies to phase splitters 14 and 16 are the result of division by 6144 and 6120, respectively, in counters 10 and 12. In the case of counter 10, the division may be produced by a combination of divide-by-4, divide-by-16, divide-by-16, and divide-by-6 counters, as will be understood by those skilled in the art. In the case of the input to phase splitter 16, division by 6120 can be accomplished by dividing by 4, by 255, and by 6, in succession. (The same divide-by-4 counter can be served for the first step in both chains of division). The structures of clock pulse generator 8, the various counters used in counters 10 and 12, the phase splitters, the gyroscope wheel supplies, and the motors driving the gyroscopes are all of kinds well-known in the art. It should be noted that, for reasons to be explained later, the counters forming counter 10 as well as the dual JK Master-Slave Flip-Flops 14 and 16 which produce the 4-phase output for driving gyroscope wheel supply 4, have reset capability.

Each of the gyroscope instruments is equipped with a pick-off, the construction of which is well understood in the art. Each pick-off provides an amplitude modulated output voltage which is proportional in phase to the position of the flywheel with respect to the housing, and is equal in frequency to the speed of the flywheel, relative to the housing. These signals are transmitted from gyros MP1 and MP2 on connecting lines 18 and 20, respectively, to wheel speed detectors 22 and 24.

Figure 2:
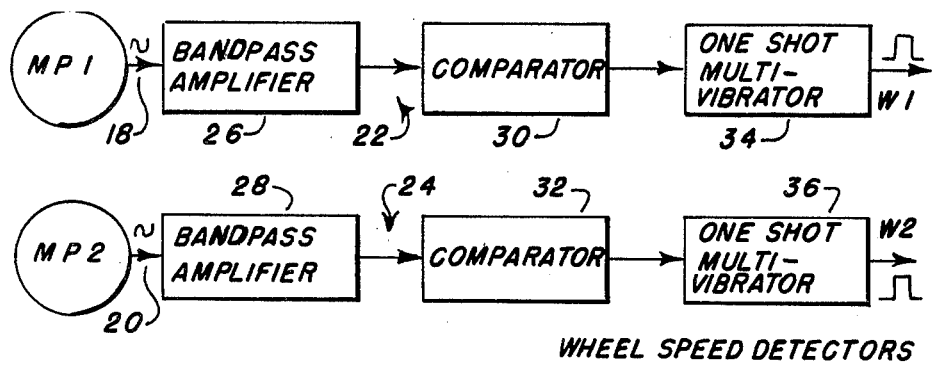
FIG. 2 is a block diagram showing two wheel speed detectors and their associated output wave forms.

As shown in FIG. 2, the signals fed on lines 18 and 20 to wheel speed detectors 22 and 24 are amplified and shaped, to improve signal to noise characteristics, in amplifiers 26 and 28 in a manner well known in the art. They are then fed, through comparators 30 and 32, to one-shot multivibrators 34 and 36, where trains of pulses W1 and W2, respectively, are generated at intervals of 0.0049152 and 0.0048960 seconds, respectively, corresponding to speeds of 203.45 and 204.25 revolutions per second. It will be seen that the speed of gyroscope MP2 is slightly faster than that of gyroscope MP1. The output pulse trains W1 and W2 from the wheel speed detectors are supplied to control logic 38 (FIG. 1) on connecting lines 40 and 42, respectively.

Figure 3:
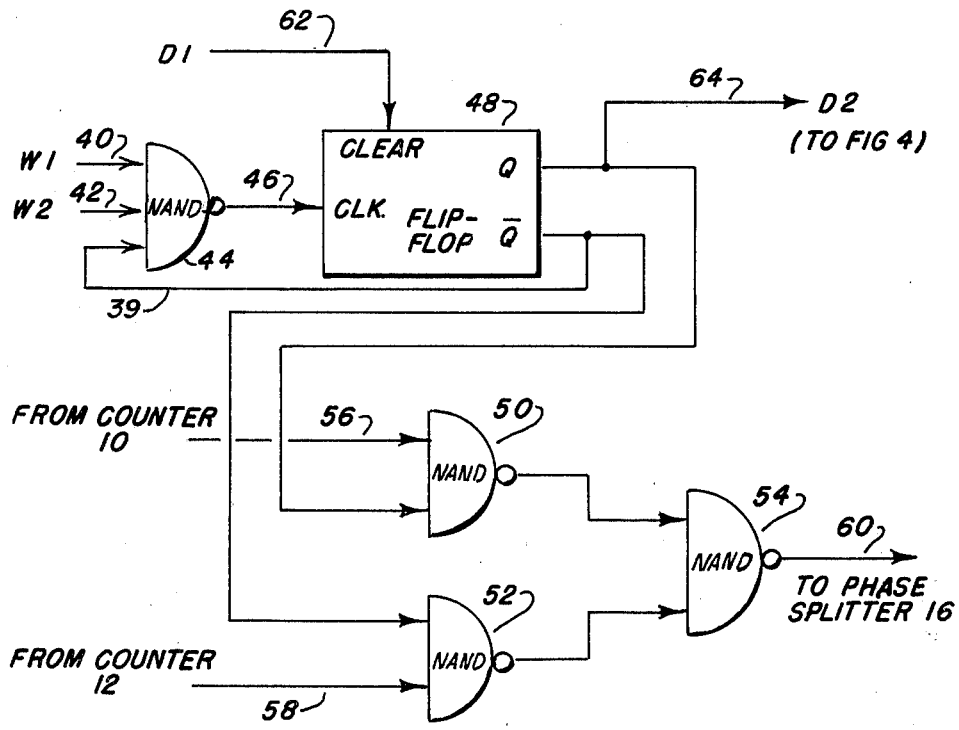
FIG. 3 is a block diagram of the control logic used in the circuit of FIG. 1.

Details of control logic 38 are shown in FIG. 3. There, wheel speed signals W1 and W2 on lines 40 and 42 are fed to two inputs of three-input NAND gate 44. The output of NAND gate 44 is connected, via line 46, to the "clock" input of D-type flip-flop 48. The "Q" output of D-type flip-flop 48 is connected to one input of NAND gate 50, and the "$\overline{Q}$" output is connected to one input of NAND gate 52. The outputs of NAND gates 50 and 52 are each connected to one input of NAND gate 54. The second input of NAND gate 50 is supplied, via line 56, with the output of counter 10. The second input of NAND gate 52 is supplied, via line 58, with the output of counter 12. The output of gate 54 is fed on connecting line 60 to phase splitter 16 (FIG. 1). The signal on the $\overline{Q}$ output of D-type flip-flop 48 is often fed back to the third input of three-input NAND gate 44. The "clear" terminal of flip-flop 48 is supplied a signal D1 on input line 62; the function of signal D1 will be made clear in the operating description below. A second output signal D2 from control logic block 38 is obtained from the Q output of flip-flop 48 and is transmitted to reset generator 65 (FIG. 1) on line 64.

The function of control logic 38 is to determine when the wheel speed input signals W1 and W2 have pulses which coincide in time. Which of the outputs of the two countdown chains is used to drive gyroscope motor MP2 is determined when flip-flop 48 (FIG. 3) is enabled by a signal D1 on line 62. The occurrence of coincidence in input signals W1 and W2 to gate 44 then results in switching the drive frequency supplied to phase splitter 16 from the output of counter 12 to the output of counter 10.

Figure 4:
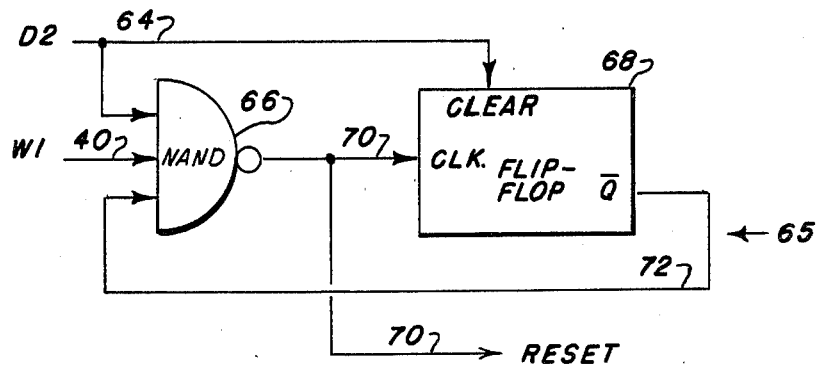
FIG. 4 is a block diagram of the reset generator used in the circuit of FIG. 1.

Reset generator 65, shown in detail in FIG. 4, responds to the D2 signal generated by control logic 38, when switch-over has been ordered, to generate a reset signal for application to counter 10 and phase splitters 14 and 16 (FIG. 1). The input signal D2 on line 64 is supplied to one input of three-input NAND gate 66 as well as to the "clear" terminal of D-type flip-flop 68. The output signal W1 of wheel speed detector 22 is fed on line 40 to another input of NAND gate 66. The output of NAND gate 66 is connected to the "clock" input of D-type flip-flop 68 and is also transmitted, on output line 70, as a "reset" signal to be fed to the reset terminals of counter 10 and phase splitters 14 and 16. The $\overline{Q}$ output of flip-flop 68 is connected to the third input of NAND gate 66. The function of reset generator 66 is to establish, once the gyroscope flywheels have been brought into mechanical synchronization, a repeatable, but not arbitrary, phase relationship between the drive and both flywheels.

Operation of the circuit of FIGS. 1 to 4 is as follows. At start-up, each of the gyroscope motors, MP1 and MP2, is separately excited by a voltage derived from division of the output of clock pulse generator 8 in the separate counters 10 and 12. The 5 MHz pulse output of clock generator 8 is divided in counter 10 by 6144 and in counter 12 by 6120. The signal from counter 10 is fed directly to phase splitter 14 where, having in effect been again divided by 4 to a frequency of about 203.45 Hz, it is fed, through gyroscope wheel supply 4, to gyroscope motor MP1. Similarly, phase-splitter 16 drives wheel MP2 at 204.25 Hz. At start-up, with control signal D1 at a state of logic zero and with input signals W1 and W2 to gate 44 not in coincidence, the output of gate 44 is a logic 1, the Q output of flip-flop 48 is a zero and the $\overline{Q}$ output is a 1. Since the $\overline{Q}$ output is a 1, NAND gate 52 is enabled and responds to pulses from counter 12, transmitting pulses to NAND gate 54. Since, at the same time, the Q output of flip-flop 48 is zero, NAND gate 50 is not enabled and its output is a 1. Therefore NAND gate 54 transmits a logic 0 each time a pulse is received from counter 12. By the same token, when the Q output of flip-flop 48 is a 1, the input signals from counter 10 on line 56 are fed through the NAND circuitry to line 60. NAND gates 50, 52 and 54 therefore switch the supply of pulses fed from counters 10 and 12 to phase splitter 16. Flip-flop 48 changes state when the input on line 46 is returned to logic 1 and the signal on Q goes to logic 1, while the $\overline{Q}$ signal goes to logic 0. Then the feedback of the $\overline{Q}$ zero signal on line 39 to NAND gate 44 maintains the output of NAND gate 44 at logic 1, regardless of any further coincidences between the W1 and W2 input signals on the other inputs of gate 44, and pulses from counter 10 are connected through to the drive of gyroscope MP2.

The purpose of signal D1 is to enable transfer of the pulse drive for gyroscope MP2 from counter 12 to counter 10 after sufficient time has elapsed to allow each gyroscope to reach a steady state condition prior to initiating the phase lock sequence. The signal can be hand generated, for instance, by simply applying a positive voltage to connecting lead 62 when the motors are up to speed. Or, the D1 signal can be generated by a one shot multivibrator (not shown) which is actuated after, for example, 30 seconds by a lapsed interval timer which is set in operation by the application of voltage to the circuits of FIG. 1. In any event, when the D1 signal appears on line 62 (FIG. 3) and coincidence in motor speeds is detected, the drive to gyroscope motor MP2 is switched so that both motors are driven at the frequency supplied by counter 10. The motor of gyroscope MP2, which had been running at a speed slightly faster than that of gyroscope MP1, then drifts downward to exactly the speed of gyroscope motor MP1, establishing flywheel phase-lock. In one experimental embodiment, this occurred in less than 6 cycles (revolutions), or about one-fourth the time required by the prior art method of forced wheel speed change.

With mechanical synchronization of the gyroscope flywheels established, the motor excitation is electrically synchronized by means of reset generator 65 of FIG. 4. This is brought about by the presence of a logic signal on the Q output of flip-flop 48, transmitted on line 64, enabling flip-flop 68 and putting a logic 1 on one input terminal of gate 66. Because the $\overline{Q}$ terminal of flip-flop 68 is at logic 1, the next W1 pulse into gate 66 on line 40 causes the output of gate 66 to go from logic 1 to 0. When line 70 goes to this level, the entire gyroscope wheel countdown chain is reset and the motor voltage feeding gyroscope wheel supplies 4 and 6 are synchronized to the outputs W1 and W2 of wheel speed detectors 22 and 24. At the same time, the $\overline{Q}$ output of flip-flop 68 goes to logic 0 and the output of NAND gate 66 returns to logic 1. The output of gate 66 then remains at logic 1 regardless of any further W1 pulses. The motor excitation of the two gyroscope motors is thus mechanically and electrically synchronized.

One method of the invention, therefore, comprises the steps of starting two synchronous gyroscope motors by first feeding them driving voltages at two slightly different frequencies. When the motors are operating synchronously with the applied voltages, the drive to the motor which is operating at a higher speed is shifted to the lower frequency source and the speed of that motor decelerates into mechanical synchronism with the slower motor. The motors are instantaneously electrically synchronized by resetting the phase of drive frequency which is now common to both motors so that it has a predetermined relationship with the position of the motor rotors, as established by one of the pick-offs.

Figure 5:
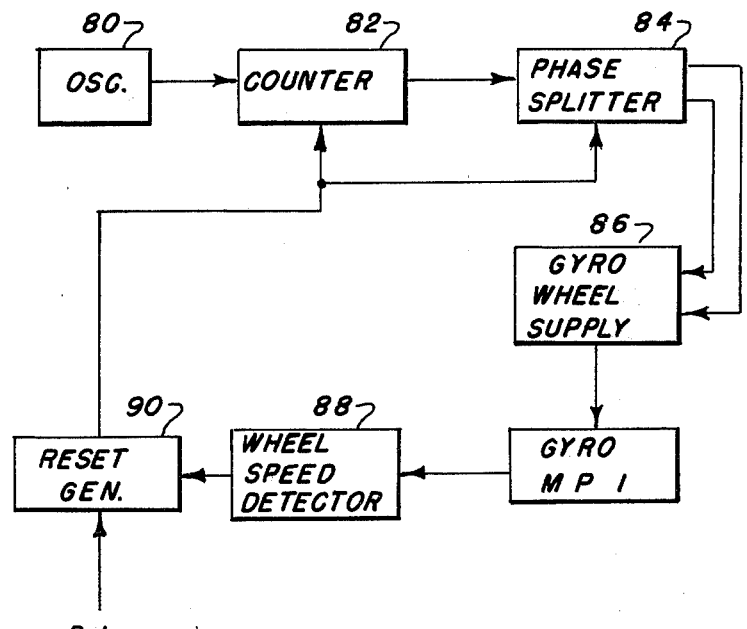
FIG. 5 is a block diagram of a circuit for phase-locking a single gyroscope.

The circuit in the block diagram of FIG. 5 illustrates the application of the teachings of the invention to the phase locking a single gyroscope wheel at start up. Oscillator 80 drives gyroscope motor MP1 via counter 82, phase splitter 84, and gyro wheel supply 86 in the same way as was done in FIGS. 1-4. The speed of the gyroscope is read out by wheel speed detector 88 and fed to reset generator 90. Reset generator 90, when activated, establishes a repeatable phase relationship between the drive and the flywheel of the gyroscope. The structure of all the components in this embodiment of the invention can be the same as that of the corresponding elements in the drive chain of motor MP1 in the embodiment of FIGS. 1-4. The difference is that the drive chain and wheel speed detector for the second gyroscope are omitted, along with the control logic, and that the discrete run signal D1 is applied directly to the reset generator in place of the D2 signal from the control logic.

Operation of the circuit is as follows. First the gyroscope drive motor is brought up to synchronous speed at the frequency established by dividing the output of oscillator 80 in counter 82 and phase splitter 84. When the gyroscope is at the desired speed, a discrete run signal is applied to reset generator 90 and when the next pulse of input signal W1 is received, reset generator 90 transmits a reset signal to counter 82 and phase splitter 84. As described above in connection with FIGS. 1-4, the output of the reset signal generator remains at the level just established, regardless of any further W1 pulses.

It will be apparent to those skilled in the art that the above method of establishing an identical phase relationship between the driving voltage and the instantaneous position of the rotative gyroscope motor each time the gyroscope is started can be readily adapted to provide a particular phase angle. Thus, a predetermined difference in phase angle can be established by resetting the counter in the drive chain to some count other than zero.

The invention, in its various aspects, has been illustrated by showing its application to starting one or two synchronous gyroscopes. It will be apparent to those skilled in the art that the principles of the invention may also be applied to the starting and synchronizing of more than two instruments, for example, by synchronizing a third unit to two which have already been synchronized. It will also be apparent that modalities other than that shown in the illustrative embodiment may be used to implement the invention. Therefore, the below-appended claims should be interpreted in keeping with the spirit of the invention, rather than limited to specific details described herein.

What is claimed is:

1. The method of synchronizing two gyroscopes, one of which is driven by a synchronous motor from an AC voltage source at a first frequency and the other of which is driven by an AC voltage source at a second frequency which is higher than the first, each gyroscope having a pick-off which generates a signal relating the position of the gyroscope wheel to the gyroscope support, comprising the steps of:

bringing the first motor to speed by driving it at the first frequency and bringing the other motor to speed by driving it at the second frequency;

comparing the relative positions of the gyroscope wheels by comparing the signals generated by each pick-off;

and, when the pick-off signals coincide, switching the drive for the gyroscope operating at the second frequency from the source having the higher frequency to the source providing the first frequency.

2. The method of claim 1 in which the synchronous speeds of the gyroscope motors established by the first and the second frequencies are a few fractions of a revolution per second apart.

3. The method of claim 1 having means for resetting the phase of the voltage generated at the first frequency and further comprising the step of:

when both motors are being driven by the AC source having the lower frequency, resetting the phase of the AC voltage to establish a predetermined relationship of the voltage with respect to signals from the gyroscope pick-offs.

4. Apparatus for synchronizing plural gyroscopes, each having a flywheel driven by a synchronous hysteresis drive motor and each carried in a gyroscope support, comprising:

a power supply for driving the motor of each gyroscope being synchronized;

means for supplying a voltage at a different frequency to each power supply;

a pick-off associated with each gyroscope for generating a reference signal related to movement of a predetermined point on the gyroscope wheel past a reference point on the gyroscope support;

means for determining when the reference signals from both gyroscopes pick-offs coincide and for generating a transfer signal; and means responsive to the transfer signal for switching the input of both power supplies to one frequency.

5. The apparatus of claim 4 further comprising:

means for resetting the phase of the voltage supplied to both motors, relative to a gyroscope reference signal.

6. The apparatus of any one of claim 4 or claim 5 in which each means for supplying a voltage at a different frequency gyroscope comprises a counter driven by a single frequency generator.

7. The apparatus of claim 6 in which the means responsive to the transfer signal comprises a gate circuit having an output coupled to the motor being synchronized and inputs connected to the output of each counter, the gate circuit being adapted to first transmit the output of one counter, and, upon receipt of the transfer signal, to transmit the output of the other counter.

8. The apparatus of any one of claim 4 or claim 5 in which the reference signal generated by each pick-off is a train of pulses.

9. The apparatus of claim 8 in which the means for determining when the reference signals coincide comprises a coincidence detector.

10. The method of phase-locking a gyroscope wheel at start-up, the gyroscope wheel carried in a support and driven by a synchronous motor powered from an AC voltage supply at a given frequency, comprising the steps of:

driving the motor to bring it up to speed;

generating a signal which is proportional in phase to the position of the flywheel relative to its support; and when the motor is up to speed, shifting the phase of the power supply voltage to establish a predetermined phase relationship between the drive voltage and the gyroscope wheel, in which the AC voltage supply comprises a resettable counter and the step of shifting the phase of the power supply voltage further comprises resetting the counter.

11. The method of claim 10 in which the step of shifting the phase of the power supply further comprises resetting the counter to zero.

12. Apparatus for phase-locking a gyroscope at startup, the gyroscope having a flywheel driven by a synchronous hysteresis drive motor and carried in a gyroscope support, comprising:

a power supply coupled to the gyroscope to provide an AC voltage at a given frequency for turning the drive motor at a given speed;

a pick-off for generating a reference signal related to movement of a predetermined point on the flywheel past a reference point on the gyroscope support; and means responsive to a transfer signal and to the reference signal for shifting the phase of the power supply voltage to establish a defined relationship between the drive voltage and the gyroscope wheel, further comprising:

the power supply comprising an oscillator and a resettable counter coupled to the oscillator for providing the AC voltage for turning the drive motor; and means for resetting the counter in response to a transfer signal and to the reference signal.

13. The apparatus of claim 12 further comprising:

the means responsive to a transfer signal for resetting the counter comprising a coincidence detector.

* * * * *